Patented Oct. 26, 1943

2,332,615

UNITED STATES PATENT OFFICE 2,332,615

PROCESSES FOR THE PRODUCTION OF 2-AMINOPYRIMIDINE

Edmond T. Tisza and Bernard F. Duesel, Yonkers, and Harris L. Friedman, New York, N. Y., assignors to Nepera Chemical Co., Inc., Yonkers, N. Y., a corporation of New York No Drawing. Application September 25, 1942, Serial No. 459,874

15 Claims. (Cl. 260—251)

Our invention relates to processes for the production of aminopyrimidines and refers particularly to processes for the production of 2-aminopyrimidine.

Several processes have been suggested for the production of 2-aminopyrimidine, which is an intermediate employed in the production of sulfanilamidopyrimidine, an important therapeutic agent.

One of the proposed processes for the production of 2-aminopyrimidine comprises the reduction of 2-amino-4-chloropyrimidine, which process consists in reducing the 2-amino-4-chloropyrimidine by means of zinc in a neutral or alkaline solution, evaporating the solution to a small volume, salting out with an alkali, preferably potassium hydroxide, and collecting the formed 2-aminopyrimidine.

The amount of 2-aminopyrimidine produced by the above described process, however, is far below the theoretical quantity that should be produced, and which is, in fact only forty per cent (40%) to fifty per cent (50%) of the theoretical quantity.

Our invention is directed to processes for the production of 2-amino-pyrimidine from 2-amino-4-chloropyrimidine in acid solution.

The steps of our processes for the production of 2-aminopyrimidine from 2-amino-4-chloropyrimidine comprise reducing the 2-amino-4-chloropyrimidine in an acid solution by means of zinc, adding a zinc salt to the thus produced mixture, evaporating to precipitate the zinc double salt of 2-aminopyrimidine thus produced and producing the 2-aminopyrimidine by the addition of an alkali. We have found that the zinc double salt of 2-aminopyrimidine thus produced consists of one mole of the zinc compound and one mole 2-aminopyrimidine.

In the following of our processes we prefer to employ zinc and acetic acid or hydrochloric acid, and potassium hydroxide or sodium hydroxide and zinc chloride but other acids and alkalies, previously used for reactions similar to those described may be employed.

We have found that the most satisfactory yields of 2-aminopyrimidine may be obtained by our process by employing 2-amino-4-chloropyrimidine, reducing with zinc in an acid solution, adding one mole, or slightly more than one mole of a zinc chloride and adding sufficient alkali to convert the thus produced zinc chloride double salt into alkali zincate and the 2-aminopyrimidine.

We have found that pH6.1 is generally most favorable for the acid reduction step, but we do not limit ourselves to this particular acid strength.

We give the following as examples of our process:

Example I 3 grams crude (88%) 2-amino-4-chloropyrimidine were dissolved in 250 cc. hot water. After the solution cooled down to 70° C., 10 gms. zinc dust and 1 cc. 50% acetic acid were added under constant stirring. The stirring was continued and the temperature of the mixture was kept constantly at 70–73° C. After about one half hour 1 cc. of 50% acetic acid was added. The stirring was continued for four and a half hours, and then the solution was filtered. 1.3 grams zinc chloride were added and evaporated down to a small volume, about 15 cc. From the cooled solution the zinc chloride double salt precipitated out. This was collected on a filter, dissolved in 20 cc. water and 12 grams solid potassium hydroxide were added. The precipitated free amine was collected on a rubber filter cloth, sucked as dry as possible and extracted with benzene. The benzene was then evaporated and the product, 1.22 grams, was dried. This represents 63% yield.

Example II 2.5 grams 2-amino-4-chloropyrimidine (96% pure) were dissolved in 250 cc. hot water, cooled to 60° and reduced with zinc dust and acetic acid as described in Example I, keeping the temperature at 60–63° C. and stirring for 2 hours. The solution was worked up as in Example I. 1.32 grams of the product were obtained which represents 75% yield.

Example III 2.5 grams 2-amino-4-chloropyrimidine (99% pure) were dissolved in 250 cc. hot water. After the solution cooled down to 70° C., 10 grams zinc dust and 1 cc. dilute (about 18%) hydrochloric acid were added under stirring. The mixture was kept under constant stirring at 70–73° C. for about 2 hours. After filtering, the solution was worked up as in Example I. 1.22 grams of the product were obtained, which represents 67% yield.

The benzene mentioned in the above Examples may be substituted by other solvents for 2-aminopyrimidine which are not miscible with water, among which are toluene, xylene, chlorinated hydrocarbons such as chloroform, carbontetrachloride, etc.

We do not limit ourselves to the specifically mentioned times, temperatures, quantities, chemicals, or steps of procedure as these are given simply to clearly describe our invention as set forth in our specifications and claims and they may be varied without going beyond the scope of our invention.

What we claim is:

1. In a process for the production of 2-aminopyrimidine the steps which comprise the reduction of 2-amino-4-chloropyrimidine in an acid solution and adding zinc chloride forming a double salt consisting of one mole of zinc chloride and one mole of 2-aminopyrimidine.

2. In a process for the production of 2-aminopyrimidine the steps which comprise the reduction of 2-amino-4-chloropyrimidine in an acetic acid solution and adding zinc chloride forming a double salt consisting of one mole of zinc chloride and one mole of 2-aminopyrimidine.

3. In a process for the production of 2-aminopyrimidine the steps which comprise the reduction of 2-amino-4-chloropyrimidine in an hydrochloric acid solution and adding zinc chloride forming a double salt consisting of one mole of zinc chloride and one mole of 2-aminopyrimidine.

4. In a process for the production of 2-aminopyrimidine the step which comprises reacting upon the zinc double salt consisting of one mole of zinc chloride and one mole of 2-aminopyrimidine with an alkali.

5. In a process for the production of 2-aminopyrimidine the step which comprises reacting upon the zinc double salt consisting of one mole of zinc chloride and one mole of 2-aminopyrimidine with potassium hydroxide.

6. In a process for the production of 2-aminopyrimidine the step which comprises reacting upon the zinc double salt consisting of one mole of zinc chloride and one mole of 2-aminopyrimidine with sodium hydroxide.

7. A process for producing 2-aminopyrimidine which comprises reducing 2-amino-4-chloropyrimidine in an acid solution, adding zinc chloride forming a compound consisting of one mole of zinc chloride and one mole of 2-aminopyrimidine, evaporating to a smaller volume, separating the precipitated said zinc chloride double salt from the solution, dissolving said precipitate, adding an alkali, and separating the precipitated 2-aminopyrimidine from the solution.

8. A process for producing 2-aminopyrimidine which comprises reducing 2-amino-4-chloropyrimidine in an acetic acid solution, adding zinc chloride forming a compound consisting of one mole of zinc chloride and one mole of 2-aminopyrimidine, evaporating to a smaller volume, separating the precipitated said zinc chloride double salt from the solution, dissolving said precipitate, adding an alkali, and separating the precipitated 2-aminopyrimidine from the solution.

9. A process for producing 2-aminopyrimidine which comprises reducing 2-amino-4-chloropyrimidine in an hydrochloric acid solution, adding zinc chloride forming a compound consisting of one mole of zinc chloride and one mole of 2-aminopyrimidine, evaporating to a smaller volume, separating the precipitated said zinc chloride double salt from the solution, dissolving said precipitate, adding an alkali and separating the precipitated 2-aminopyrimidine from the solution.

10. A process for producing 2-aminopyrimidine which comprises reducing 2-amino-4-chloropyrimidine with zinc dust in the presence of an acid, filtering the dissolved reduction product, adding zinc chloride to the solution, evaporating to precipitate the zinc chloride double salt thus produced, adding an alkali thereto and separating the 2-aminopyrimidine therefrom.

11. A process for producing 2-aminopyrimidine which comprises reducing 2-amino-4-chloropyrimidine with zinc dust in the presence of hydrochloric acid, filtering the dissolved reduction product, adding zinc chloride to the solution, evaporating to precipitate the zinc chloride double salt thus produced, adding an alkali thereto and separating the 2-aminopyrimidine therefrom.

12. A process for producing 2-aminopyrimidine which comprises reducing 2-amino-4-chloropyrimidine with zinc dust in the presence of acetic acid, filtering the dissolved reduction product, adding zinc chloride to the solution, evaporating to precipitate the zinc chloride double salt thus produced, adding an alkali thereto and separating the 2-aminopyrimidine therefrom.

13. A process for producing 2-aminopyrimidine which comprises reducing 2-amino-4-chloropyrimidine with zinc dust in the presence of an acid, filtering the dissolved reduction product, adding zinc chloride to the solution, evaporating to precipitate the zinc chloride double salt thus produced, adding an alkali thereto and separating the 2-aminopyrimidine therefrom by means of a volatile solvent.

14. A process for producing 2-aminopyrimidine which comprises reducing 2-amino-4-chloropyrimidine with zinc dust in the presence of hydrochloric acid, filtering the dissolved reduction product, adding zinc chloride to the solution, evaporating to precipitate the zinc chloride double salt thus produced, adding an alkali thereto and separating the 2-aminopyrimidine therefrom by means of a volatile solvent.

15. A process for producing 2-aminopyrimidine which comprises reducing 2-amino-4-chloropyrimidine with zinc dust in the presence of acetic acid, filtering the dissolved reduction product, adding zinc chloride to the solution, evaporating to precipitate the zinc chloride double salt thus produced, adding an alkali thereto and separating the 2-aminopyrimidine therefrom, by means of a volatile solvent.

EDMOND T. TISZA.
BERNARD F. DUESEL.
HARRIS L. FRIEDMAN.